(12) United States Patent
Sendelweck

(10) Patent No.: US 7,173,673 B2
(45) Date of Patent: Feb. 6, 2007

(54) EXPANDED SWITCHING OF VIDEO/S-VIDEO SIGNALS BY AUTO-SENSE APPARATUS DESIGNED TO INITIATE SWITCHING OF A DIFFERENT TYPE OF VIDEO SIGNAL AND APPARATUS FOR EMULATING ONE TYPE OF SIGNAL BY ANOTHER TYPE OF SIGNAL TO INITIATE SAID SWITCHING

(75) Inventor: Gene Karl Sendelweck, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 758 days.

(21) Appl. No.: 09/947,072

(22) Filed: Sep. 6, 2001

(65) Prior Publication Data

US 2003/0048387 A1    Mar. 13, 2003

(51) Int. Cl.
*H04N 5/268*    (2006.01)

(52) U.S. Cl. ..................................... 348/705

(58) Field of Classification Search ................ 348/705, 348/706, 554–558
See application file for complete search history.

(56) References Cited

U.S. PATENT DOCUMENTS

| | | | | |
|---|---|---|---|---|
| 4,660,073 A | * | 4/1987 | Baumeister | 348/554 |
| 4,860,090 A | * | 8/1989 | Murata et al. | 348/604 |
| 5,267,024 A | * | 11/1993 | Murayama | 348/643 |
| 5,349,385 A | * | 9/1994 | Glenn | 348/458 |
| 6,072,541 A | * | 6/2000 | Song | 348/706 |

* cited by examiner

*Primary Examiner*—Michael H. Lee
(74) *Attorney, Agent, or Firm*—Joseph J. Laks; Harvey D. Fried; Patricia Verlangieri

(57) ABSTRACT

A video switching system wherein an integrated circuit designed to switch video signals responsive to a first type of signal is used to switch video signals of a second type of signal which is adapted to emulate the first type of signal. Circuitry for adapting the second type of signal to emulate the first type of signal is disclosed. A plurality of the adapted signals, where each would normally be coupled to their own IC input terminal, are couplable to a single S2 protocol terminal of the integrated circuit, through a single lead.

4 Claims, 1 Drawing Sheet

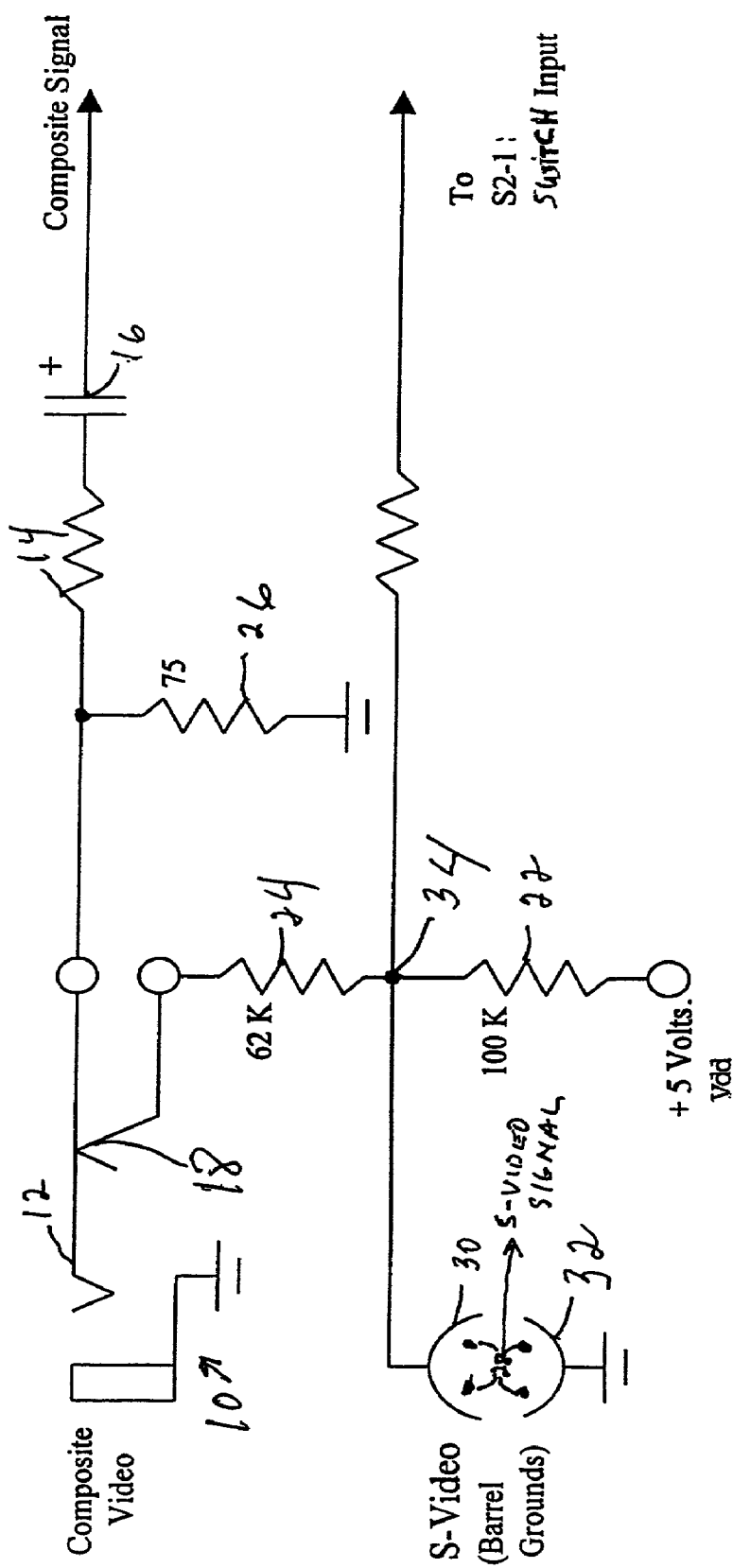

EXPANDED SWITCHING OF VIDEO/S-VIDEO SIGNALS BY AUTO-SENSE APPARATUS DESIGNED TO INITIATE SWITCHING OF A DIFFERENT TYPE OF VIDEO SIGNAL AND APPARATUS FOR EMULATING ONE TYPE OF SIGNAL BY ANOTHER TYPE OF SIGNAL TO INITIATE SAID SWITCHING

FIELD OF THE PRESENT INVENTION

The present invention relates to video systems, and more particularly to the switching of video signals.

BACKGROUND

In general, it is common in the field that video switching jacks are used to sense when signal leads are plugged into the jacks. A line couples the status of the jack to a pin of the video switching integrated circuit (IC) and a corresponding status bit is set. A programmable microprocessor reads the status over the bus, e.g., an I$^2$C bus, and configures electronic switches of the video switching IC according to an algorithm.

The present device, is a television set/receiver with or without a video display. In a typical receiver, all input signals are coupled to an audio/video switch IC. The desired input is normally selected from a menu using an input key on a remote control. The menu will sequentially cycle through the input states in a wrap-around endless loop.

More particularly, the present invention concerns a CXA2089 switch IC made by the Sony Corp. of Japan. For each input state, a designated pin on the switch IC is used to detect a signal presence, and in response thereto, a corresponding bit is stored in a designated register(s). The microprocessor reads the register(s) over the bus and reacts according to a preprogrammed algorithm to close or open the proper switches of the IC. The CXA2089, has only three such input terminals to sense signal presence, and in the present situation, not only were all of these input terminals used, but even more were required for sensing additional input signal requirements, as discussed more fully below.

It should be noted that the television receiver often has both front and rear panel jacks for accepting plugs with various signals. The rear or non-front panel signals provide a basic set-up for the device with the basic set-up being changeable by the presence of front panel signals, since the front panel signals are user changes of more immediate status. In the particular case, it is further desirable to have a front panel composite video override any of the other states or conditions, and then to have an S-video component signal, if plugged into a front jack, to override the front composite video as well as the other states. However, these extra switching requirements require two extra input sense pins on the switch IC, and, as stated above, all of the conventional pins were being used for other switching requirements and thus, were not available.

However, the switch IC has three of what are called "S2 protocol" input switching pins (discussed more fully below), which are designed to be used to select picture aspect ratio by sensing DC voltage on the chroma signal. Aspect ratio is not an issue for this receiver because all signals have a 4:3 aspect ratio. However, by applying the proper DC voltages to one or more of these S2 protocol pins, further bits can be stored in corresponding registers in the switch IC, the microprocessor can then read these bits over the bus, and close the proper switch IC switches according to a preprogrammed algorithm to have the front composite signal override all other input signals and to have front S-Video component signal override the front composite signal as well as all other input signals.

When S-video component signals were first originated, it was decided that a DC signal could be applied to the chrominance signal to indicate to a receiving device that a change of aspect ratio was to be initiated. A change of aspect ratio indicated by the introduction of a DC bias voltage to the chroma signal for a 16:9 anamorphic picture is shown in Lagoni, U.S. Pat. No. 5,629,776, assigned to an antecessor of the assignee of the present patent application. Over the years, the S-video aspect ratio indicator signal has been expanded to include three levels, i.e., tri-state, of input DC voltage plus zero, and is called the "S2 protocol" according to EIAJ standard No. CPR-1202, for "Identification Signal of Video Signals With Different Aspect Ratio and the Transfer Methods". Thus, it is desirable to use these S2 protocol compliant pins for an unintended purpose, i.e., to trick the S2 protocol input terminals into initiating the switching of non-S2 protocol signals. Additionally, such S2 protocol integrated circuit input terminals are designed to be responsive to the DC level of a single type of input signal coupled to the particular pin, i.e., each pin is to receive its own single signal corresponding to the S2 protocol on an individual basis.

SUMMARY OF THE INVENTION

A video switching system wherein an integrated circuit designed to switch video signals responsive to a first type of signal is used to switch video signals of a second type of signal which is adapted to emulate the first type of signal. Circuitry for adapting the second type of signal to emulate the first type of signal is disclosed. A plurality of the adapted signals, where each would normally be coupled to their own IC input terminal, are couplable to a single S2 protocol terminal of the integrated circuit, through a single lead.

BRIEF DESCRIPTION OF THE DRAWING

The sole drawing FIGURE shows a circuit for adapting non-S2 protocol signals so that the non-S2 protocol signals will emulate S2 protocol signals in order to initiate switching of non-S2 protocol video signals.

DETAILED DESCRIPTION OF THE PREFERRED EMBODIMENT(S)

The data sheet of the present CXA2089 IC provides sufficient data for formulating a table for each of the S2 protocol compatible input terminals, indicating DC voltage input levels and resultant register status bits for any one of the S2 protocol input terminals, as follows:

TABLE 1

| S2-1 pin DC voltage | status register data 1-b3 | status register data 1-b2 |
|---|---|---|
| ≦1.3 V | 0 | 0 |
| >1.3 V to <2.5 V | 0 | 1 |
| ≧2.5 V | 1 | 0 |
| Open | 1 | 1 | where the S2-1 input pin means a first one of three S2 protocol pins/terminals and register designations 1-b2 and 1-b3 are the b2 and b3 data registers associated with the S2-1 pin. Since the IC has three S2 protocol pins, any of the three S2 pins and their associated registers can be used.

According to the IC data sheet, as required by the S2 protocol, a superimposed DC voltage onto the chroma signal corresponds to a 4:3 aspect ratio signal for 1.3 volts DC or less, a 4:3 letter-box signal corresponds to 1.3 volts DC or more to 2.5 volts DC or less, and a 16:9 picture squeezed signal corresponds to 2.5 volts DC or more. Thus, the S2 protocol pins are tri-state pins. These pins are pulled to ground by a 100 Kohm resistor (not shown) so that the 4:3 video signals are selected when no DC is detected. The status of the two data registers is responsive to the DC level as shown in table 1. As specified in the data sheet and common in the art, control is performed by a microprocessor (not shown) via the I²C bus which is the bus for which the present IC is designed for, but any other appropriate bus can be used with a suitable IC.

However, the additional desired switching, unable to be performed because of an inadequate number of sense pins on the IC as discussed above, can be accomplished by coupling signals, corresponding to the non-S2 protocol video signals, to be adapted and processed by the S2 protocol sensing portions of the IC. When this is done, only a single wire/lead is necessary for conducting the plurality of non-S2 protocol signals instead of the normally required four wires for each different switching state, to the sensing pins/terminals of the IC. The drawing figure, explained more fully below, shows how DC voltages, coupled to any one of the three IC S2 protocol terminals, are provided for the switching of composite video and S-video signals which do not conform to the S2 protocol, thereby emulating signals according to the S2 protocol. The IC status register bits for different front panel input signals are shown in table 2.

TABLE 2

| Front Input signal | VDC-sensed | status register data 1-b3 | status register data 1-b2 |
|---|---|---|---|
| No Input | 1.9 VDC | 0 | 1 |
| Composite | 5.0 VDC | 1 | 0 |
| S-Video | 0.0 VDC | 0 | 0 |
| Both | 0.0 VDC | 0 | 0 |

Referring now to the figure which shows the front panel video input jacks, with no composite signal being coupled to switching jack 10, jack terminal 12, is coupled through isolation resistor 14 and coupling capacitor 16, to video processing circuitry (not shown). Terminal 12 is contacted by a normally closed (NC) contact 18 which is coupled to 5 volt Vdd by divider resistors 22 and 24 of 100 Kohm and 62 Kohm respectively. Divider 22, 24, through contact 18, goes to ground via 75 ohm resistor 26, which additionally provides a 75 ohm termination for any composite video line. This divider arrangement provides a 1.9 volt DC signal at node 34 to the S2 protocol terminal of the IC when no plug is inserted into jack 10 and the data register status is as shown in table 2 for a no-input condition.

When a plug is inserted into switching jack 10 for coupling a non-S2 protocol composite signal to video processing circuitry (not shown), terminal 18 no longer contacts terminal 12, there is no longer a ground return through resistor 26, and a 5.0 VDC Vdd is applied to the S2 protocol input pin of the IC so that the data registers are as shown in table 2 for the composite signal input condition.

Non-S2 protocol S-video signals at terminals 28 are coupled to respective video processing circuitry (not shown) for processing and subject to being s switched as determined by table 2 above. The barrel of an S-video plug, when inserted, connects terminal 30 to ground terminal 32, thus connecting node 34 at the junction of resistors 22, 24 to ground and any effect of terminal 18 making or not making contact in response to a composite input signal at jack 10, is overridden. Thus, zero volts DC is applied to the S2 protocol pin S2-1 and the data registers are as shown in table 2 for an S-video front panel input.

When both of the non-S2 protocol signals are present, i.e., composite at terminal 12 and S-video at terminal 30, node 34 is still connected to ground and thus, zero volts is applied to the S2 protocol pin S2-1. Thus, this condition is the same as for an S-video signal being presented with the S-video condition overriding the composite signal condition, and IC switching is accomplished according to the data registers as shown in table 2 for both signal inputs.

It should be noted that the plurality of the switching signals from the front panel are provided to the S2 protocol input terminal of the switching IC via a single lead. The normal situation would require that each of the signals have its own lead going to its own input sensing pin of the switching IC.

Thus, the non-S2 protocol composite signal and the non-S2 protocol S-video signal are able to be switched by an S2-protocol switch because non-S2 protocol switching signals are adapted to emulate a respective S2 protocol signal recognizable by the IC for switching by the IC. It should again be noted that the switching of the present video signals does not involve any changes of aspect ratio which the S2 protocol is concerned with.

The microprocessor executes its algorithm by reading the status registers data 1-b3 and data 1-b2, of table 2, comparing the values in the status registers versus a lookup table, and causing the switch IC to close the proper switches to route the selected signals for processing. The table 3 shows the resultant actions of the microprocessor:

TABLE 3

| status register data 1-b3 | status register data 1-b2 | Action by the microprocessor |
|---|---|---|
| 0 | 1 | Controls the IC video switches to return to the default mode, or to the mode that was selected before anything was plugged into the front panel jacks. |
| 1 | 0 | Controls the IC video switches to select front panel composite video to send to the video processing circuitry. |
| 0 | 0 | Controls the IC video switches to select front panel S-Video to send to the video processing circuitry. |

The invention claimed is:

1. A video switching system comprising:
   means for switching video signals responsive to switching signals according to an S2 protocol, and
   means for adapting non-S2 protocol switching signals to emulate S2 protocol signals so that the adapted signals will initiate switching.

2. A video switching system comprising:
   means for providing an integrated circuit designed to switch video signals responsive to a first type of signals received at designated integrated circuit terminals,
   means for adapting a second type of signal to emulate the first type of signal, and means for coupling the adapted second type of video signal to said terminals to initiate switching by the integrated circuit.

3. A video switching system comprising:

means for switching video signals responsive to switching signals according to an S2 protocol, and means for adapting non-S2 protocol switching signals to be compatible with the S2 protocol so that the adapted signals will initiate switching, a plurality of said adapted signals being couplable to said means for switching by a single input lead.

4. A video switching system comprising:

means for providing an integrated circuit designed to switch video signals responsive to a first type of signals received at designated integrated circuit terminals, means for adapting a second type of signal to emulate the first type of signal, and means for coupling the adapted second type of video signal to said terminals to initiate switching by the integrated circuit, a plurality of said adapted signals being couplable to a single terminal.

\* \* \* \* \*